United States Patent [19]
Liu et al.

[11] Patent Number: 5,846,507
[45] Date of Patent: Dec. 8, 1998

[54] $FE_{1-X}$O-BASED CATALYST FOR AMMONIA SYNTHESIS

[75] Inventors: Huazhang Liu; Ruyu Xu; Zurong Jiang; Zhangneng Hu; Yanying Li; Xiaonian Li, all of Zhejiang, China

[73] Assignee: Zhejiang University of Technology, Zhejiang, China

[21] Appl. No.: 637,821

[22] PCT Filed: May 26, 1994

[86] PCT No.: PCT/CN94/00041

§ 371 Date: Jul. 2, 1996

§ 102(e) Date: Jul. 2, 1996

[87] PCT Pub. No.: WO95/32798

PCT Pub. Date: Dec. 7, 1995

[51] Int. Cl.$^6$ .............................. C01C 1/04; B01J 23/745
[52] U.S. Cl. .......................... 423/362; 423/363; 423/632; 502/241; 502/242; 502/243; 502/247; 502/248; 502/250; 502/254; 502/255; 502/257; 502/258; 502/302; 502/305; 502/306; 502/308; 502/312; 502/314; 502/316; 502/319; 502/320; 502/321; 502/322; 502/323; 502/324; 502/328; 502/330; 502/332; 502/338
[58] Field of Search ...................................... 423/362, 632, 423/363; 502/338, 241, 242, 243, 247, 248, 250, 254, 255, 257, 258, 302, 305, 306, 308, 312, 314, 316, 319, 320, 321, 322, 323, 324, 328, 330, 332, 337

[56] References Cited

U.S. PATENT DOCUMENTS

| | | | |
|---|---|---|---|
| 2,276,679 | 3/1942 | Abbott | 423/362 |
| 3,243,386 | 3/1966 | Nielsen et al. | 423/362 |
| 3,951,862 | 4/1976 | Sze | 423/362 |
| 4,668,658 | 5/1987 | Jennings | 502/338 |
| 4,703,030 | 10/1987 | Khader et al. | 502/338 |
| 4,789,657 | 12/1988 | Pernicone et al. | 502/338 |

OTHER PUBLICATIONS

J.W. Mellor, *A Comprehensive Treatise on Inorganic and Theoretical Chemistry*, Vol. XII (1932), Longmans, Green and Co., pp. 634–636.

*Primary Examiner*—Wayne Langel
*Attorney, Agent, or Firm*—McAulay Nissen Goldberg Kiel & Hand LLP

[57] ABSTRACT

This invention relates to a catalyst for ammonia synthesis. The main phase of the catalyst is a non-stoichiometric ferrous oxide expressed as $Fe_{1-x}O$, which is structurally in a Wustite crystal phase form having the rock salt face-centered cubic lattice with lattice paracueter of 0.427–0.433 nm. This catalyst, which has quick reduction rate and high activity, and remarkably lowers the reaction temperature, is especially applicable as an ideal low-temperature, low-pressure ammonia synthesis catalsyt and can be widely used in ammonia synthesis industry.

19 Claims, 2 Drawing Sheets

$FE_{1-x}O$-BASED CATALYST FOR AMMONIA SYNTHESIS

This invention relates to a solid catalyst, a process for its preparation and its use in the ammonia synthesis industry.

At present, the prior art ammonia synthesis catalysts are commonly prepared by melting magnetite and minor amount of promoters in an arc furnace (or resistance furnace, or inductor furnace). During the melting process, small amount of pure iron (less than 5% by weight) is added in most case so as to adjust the ratio $Fe^{2+}/Fe^{3+}$ to a specified value. The iron oxide formed in the catalyst, generally referred to as the "main phase" or the "main component" is mainly $Fe_3O_4$, its content ranging from 78 to 95% by weight, and its chemical composition is 24–40% by weight of FeO, 52–70% by weight of $Fe_2O_3$ and 4–7% by weight of promoters (based on the total weight of the catalyst, and the same hereafter). The ratio of divalent iron to trivalent iron ($Fe^{2+}/Fe^{3+}$) ranges from 0.4 to 0.8. Ammonia synthesis catalysts available from different countries over the world such as KM catalyst made in Denmark, C73 catalyst in U.S.A., IC135-4 and 74-1 catalysts in U.K., BASF catalyst in Germany, CA catalyst in former U.S.S.R., and A series catalysts in China, all have $Fe_3O_4$ as their main component without any exception (Timm.B., 8th International Congress on Catalysis, Berlin, 2–6, Jul., 1984), whose ratios of $Fe^{2+}/Fe^{3+}$ all range between 0.4 and 0.8. For example, BASF-E1 ammonia synthesis catalyst made by BASF Co. Germany has a chemical composition as follows: 31.3% by weight of FeO and 62.53% by weight of $Fe_2O_3$ with the $Fe^{2+}/Fe^{3+}$ ratio of 0.56, as well as small amount of promoters composed of 2.9% by weight of $Al_2O_3$, 0.97% by weight of $K_2O$, 1.65% by weight of CaO, 0.30% by weight of MgO and 0.35% by weight of $SiO_2$ (Slack AV and Russell James G, Ammonia (in four parts) part III, Marcel Dekler Inc, New York, 1977: 84–87).

The conventional ammonia synthesis catalysts are based on $Fe_3O_4$ whose crystal phase is in magnetite form having spinet structure with lattice parameter of 0.838. 0.841 nm (XRD) and having strong magnetism, this is the essential feature decisive to the performance of the pior art catalyst products. The bulk density before reduction is 2.7–2.9g/cm$^3$ and the specific surface area after reduction is 13–16m$^2$/g (BET). Under the experimental conditions of pressure at 30MPa, temperature at 425° C., space velocity of 30,000m$^3$/m$^3$h and a stoichiometric mixture of nitrogen and hydrogen, the ammonia concentration at the reactor exit is 22–24% by volume, and the ammonia concentration in equilibrium is 41.78% by volume under the same condition. Therefore, as far as the prior art ammonia synthesis catalysts are concerned, not only high pressure and temperature are needed, but also the reaction for ammonia synthesis is far from ammonia equilibrium concentration, especially at low temperature. Furthermore, 5–7 days of reduction time is needed when the conventional ammonia catalysts are put to use in industry, which indicates their slower reduction rate. As for the conventional catalysts containing cobalt (Co) (e.g., IC174-1 catalysts), cost for preparing them is even higher. All these defects are due to the disadvantages of the magnetite which constitutes the main phase of the conventional catalyst.

For more than eighty years, ammonia synthesis catalysts have been researched extensively and intensively by different countries over the world, but all these efforts are limited to changing types and quantities of promoters under the condition of remaining $Fe_3O_4$ as the main phase unchanged, and they neglect the crucial value of improving the composition and structure of the main phase to the performances of the catalysts, so, the progress in developing new system of ammonia synthesis catalyst having better performance is little. The research work of ammonia synthesis catalysts carried out in different countries over the world is almost a repetition on the same level, and is unable to make a breakthrough in the development of the catalyst.

The purpose of this invention is to a provide a new system of catalyst for ammonia synthesis based on a non-stoichiometric ferrous oxide expressed as $Fe_{1-x}O$ as the main phase, which is in a Wustite crystal form, to provide a process for the preparation of this new system of the said Wustite-based catalyst, and to use this new Wustite-based catalyst in ammonia synthesis production. The inventive catalyst has many important advantages over the prior art catalysts such as high activity, low reaction temperature, high reduction rate, low cost of preparation, and suitability in industrial production, representing a breakthrough at the system of the conventional iron-melting catalyst based on magnetite ($Fe_3O_4$) as the main component.

One object of this invention is therefore to provide a catalyst product comprising a non-stoichiometric ferrous oxide Wustite, expressed as $Fe_{1-x}O$ as the main component and promoters.

The iron oxide constituting the main phase of the catalyst of this invention is a non-stoichiometric ferrous oxide expressed as $Fe_{1-x}O$, which is structurally in Wustite crystal phase form, having the rock salt structure with face-centered cubic lattice and lattice parameter of 0.427–0.433nm measured by XRD (Phillips-PW1732 X-diffractometer) wherein X ranges from 0.023 to 0.14( See 1-OC, Yusfen, Theory of Metal Technology of Iron Ore Raw Material, Translated by Hou Xilun, Beijing: Metallurgical Industry Press. 1991). Therefore, the chemical component ($Fe_{1-x}O$, x=0.023–0.14) and its crystal structure (Wustite) of the main phase of the catalyst according to this invention differ essentially from the chemical component ($Fe_3O_4$) and the crystal structure (magnetite) of the main phase of the conventional prior art catalysts.

The catalyst of this invention contains 88–99% by weight of Wustite expressed as $Fe_{1-x}O$ wherin x=0.023–0.14, and 2–12% by weight of promoters. According to the theory of solid chemistry, non-stoichiometric ferrous oxide, i.e. $Fe_{1-x}O$ may be regarded as the solid solution of $Fe^{2+}O$ and $Fe^{3+}_2O_3$. Therefore, according to chemical analysis (EDTA volumetry), the chemical composition of the catalyst according to this invention are 56–93% by weight of FeO and 5–35% by weight of $Fe_2O_3$, and the ratio of divalent iron to trivalent iron ($Fe^{2+}/Fe^{3+}$) ranges from 2 to 20. The content of FeO (by chemical analysis) is flexible in between 56 and 93% by weight so as to reach a specified $Fe^{2+}/Fe^{3+}$.

The catalyst of this invention also comprise promoters, which are composed of two or more substances selected from $Al_2O_3$, $K_2O$, CaO, CoO, $MnO_2$, $MoO_3$, $Cr_2O_3$, $SiO_2$, $ZrO_2$, $V_2O_5$, MgO, $WO_3$, BaO and such rare-earth metal oxides as $CeO_2$ and $La_2O_3$, etc.

The total content of promoters comprised the catalyst according to this invention ranges from 2 to 12% by weight, preferably 3–8%. Contents of each individual promoter range as follows (by weight %, based on the total weight of the catalyst):

| | | | |
|---|---|---|---|
| $Al_2O_3$ | 1–6 | preferably | 1.5–4.0 |
| $K_2O$ | 0.3–2 | preferably | 0.3–1.3 |
| CaO | 0.6–4 | preferably | 0.9–3.0 |
| MgO | 0.2–3.8 | preferably | 0.4–2.0 |
| $V_2O_5$ | 0.1–2.5 | preferably | 0.3–1.8 |

-continued

| | | | |
|---|---|---|---|
| $CeO_2$ | 0.1–2 | preferably | 0.2–1.3 |
| $WO_3$ | 0.2–5 | preferably | 0.2–3.5 |
| $ZrO_2$ | 0.2–3 | preferably | 0.3–2.0 |
| $La_2O_3$ | 0.1–2 | preferably | 0.2–1.5 |
| $MoO_3$ | 0.1–3 | preferably | 0.2–1.8 |
| $MnO_2$ | 0–2 | preferably | 0.2–1.5 |
| $Cr_2O_3$ | 1–4 | preferably | 1.5–3.0 |
| $BaO$ | 0.2–2 | preferably | 0.2–1.3 |
| $CoO$ | 2–6 | preferably | 2–5 |
| $SiO_2$ | 0.2–0.8 | preferably | ≦0.4 |

Another object of this invention is to provide a process for preparing this catalyst. The raw materials for manufacturing this catalyst of the invention include magnetite (available from Linju County, Shandong Province, China), in which $SiO_2 \leq 0.4\%$ (wt), $S \leq 0.01\%$ (wt), $P \leq 0.04$(wt), Fe>70% (wt), $Fe^{2+}/Fe^{3+}>0.4$, and its particles size ranges from 100–120 Tyler mesh; metallic iron powder (made by Shanghai Power Metallurgy Factory, China), in which $Fe \geq 98.0\%$ (wt), insoluble in acid $\leq 0.5\%$ (wt), particle size ranges from 100–120 Tyler mesh or, as a substitute of the iron powder, waste ammonia synthesis catalyst discharged from ammonia synthesis factories (whose main component is α-Fe. with $S \leq 0.05\%$ (wt) and $SiO_2 \leq 0.45\%$ (wt)), and the metal oxides, nitrates or carbonates of aluminum, potassium, calcium etc as the promoters. If necessary, carbon substances such as graphite, active carbon, or coke can also be used as reductants.

The catalyst of this invention can be produced by a conventional method such as the melting method comprising following processive steps: weighing iron powder (or waste ammonia synthesis catalyst discharged from factory, or carbon), magnetite, and the promoters (metal oxides, nitrates or carbonates of aluminum, potassium, calcium etc.) mentioned above, mixing them in specific ratios in a mixer and melting them in arc furnace (or resistance furnace, or inductor furnace); after the melt is cooled down in a cooler, crushing the solidified material to the required particle sizes which in general can be 1.5–3.0, 2.2–3.3, 3.3–4.7, 4.7–6.7, 6.7–9.4, 9.4–13mm, etc (depends on the users' requirments).

The non-stoichiometric ferrous-oxide Wustite expressed as $Fe_{1-x}O$ in the catalyst of this invention is formed from the chemical reaction between the iron (or carbon) as reductants and magnetite at a high temperature during the melting process, in which the main component and its Wustite crystal structure can be obtained by monitoring and adjusting the ratio of $Fe^{2+}/Fe^{3+}$. Metallic iron added herein acts to reduce magnetite into $Fe_{1-x}O$ wherein x=0.023–0.14 with the $Fe^{2+}/Fe^{3+}$ ratio in the ranges of 2–20. On contrast, the purpose of adding a little amount of iron in the preparation of the conventional catalyst is to maintain the main component in magnetite phase and to adjust the $Fe^{2+}/Fe^{3+}$ ratio in the range of 0.4–0.8, which differs essentially from that of this invention.

The catalyst product of this invention does not possess magnetism before reduction (except for some fine powders), whose bulk density is 2,8–3.3g/cm$^3$, and the crystal structure of the main phase is characterized by XRD and Mossbauer spectrum to be Wustite expressed as $Fe_{1-x}O$ and its lattice parameter is 0.427–0.433 nm, the specific surface area after reduction is 10–18m$^2$/g (BET).

A further object of this invention is to use the inventive catalysts in ammonia synthesis industry. By charging the inventive catalyst in a industrial ammonia synthesis reactor, mixture of hydrogen and nitrogen can be converted into ammonia under normal operation conditions such as at a pressure in the range of 5 to 50Mpa, a temperature in the range of 300° C. to 500° C. and various apace velocity(m$^3$/m$^3$h).

Compared with the existing technology i.e the conventional catalysts, the inventive catalyst has much better performance features such as very high reduction rate, extraordinarily high ammonia synthesis activity after reduction, requiring much lower reduction and reaction temperature, high mechanical strength, good thermostability and poisoning-resistance against poisoning substances such as $O_2$, $H_2O$, $CO$, $CO_2$, etc. Besides, compared with catalysts containing cobalt Co, the cost of preparation of the inventive catalyst is reduced to a great extent.

Figure 1:
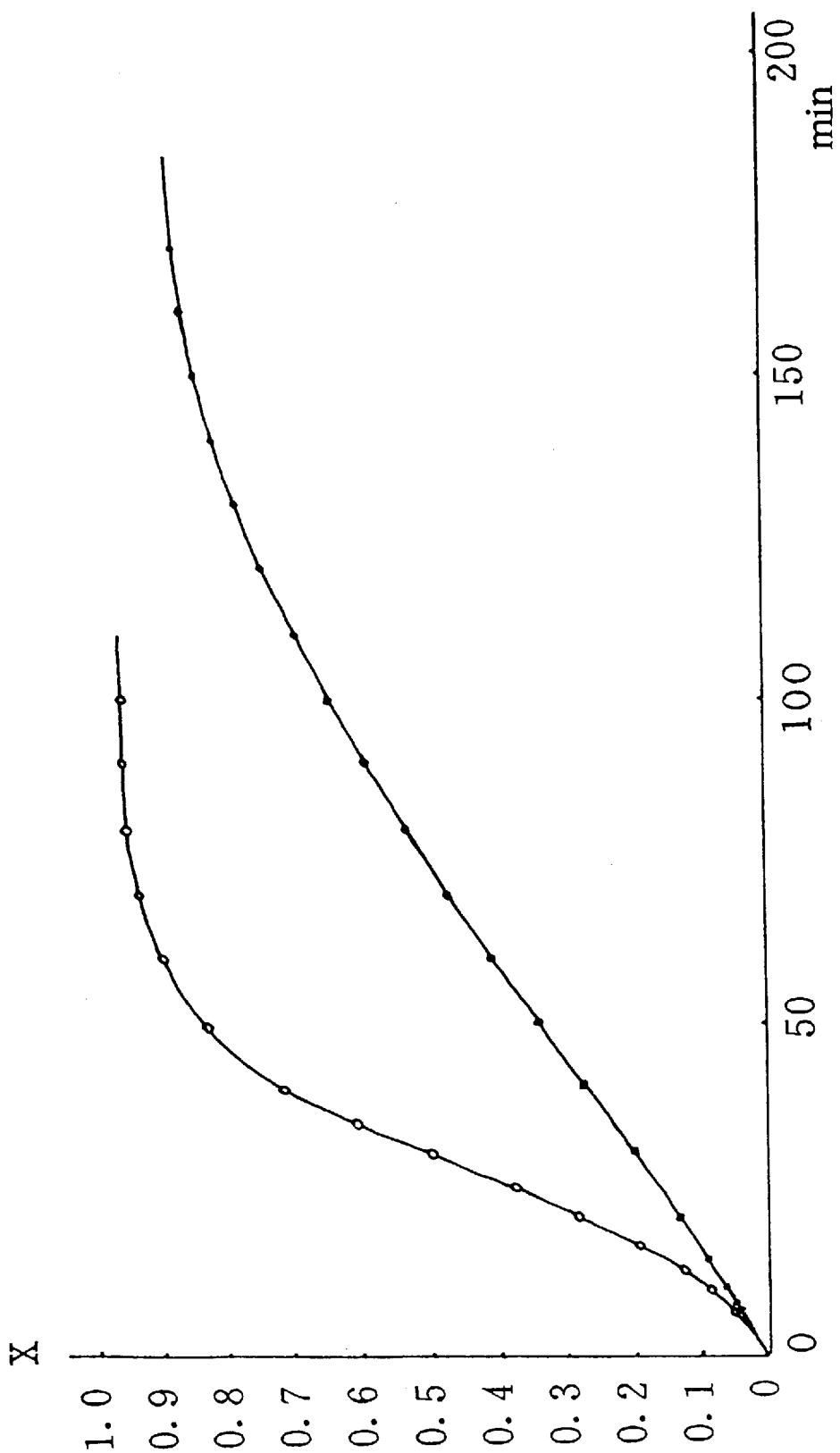
FIG. 1 shows the reduction rate of the catalyst of the present invention as compared with a conventional catalyst.

The catalyst of this invention has very high activity, good thermostability and poisoning-resistance (see Table 1). Under the experimental conditions of reaction at pressure of 30MPa, space velocity of 30,000m$^3$/m$^3$h, a stoichiometric mixture of nitrogen and hydrogen, the catalyst particle size of 1.0–1.4mm, charge of 2ml catalyst and at temperature of 425° C., the ammonia concentration at the exit of the reactor can reach up to 30–32.5% by volume and the activity maintains the same after heating at 525° C. for 20 hours.

TABLE 1

Activity and thermostability of the catalyst of this invention

| Reaction temperature °C. | | 450 | 425 | 400 | 375 | 350 |
|---|---|---|---|---|---|---|
| Activity before heat treatment | $NH_3$ % (Vol) | 31.43 | 30.36 | 24.70 | 19.66 | 13.91 |
| Activity after heat treatment* | $NH_3$ % (Vol) | 31.45 | 30.27 | 24.75 | 19.86 | 14.00 |

*after heating at 525° C. for 20 hours

TABLE 2

Activity and thermostability of the conventional catalyst*

| Reaction temperature°C. | | 450 | 425 | 400 | 375 |
|---|---|---|---|---|---|
| Activity before heat treatment | $NH_3$ % (Vol) | 26.44 | 23.41 | 18.79 | 13.47 |
| Activity after heat treatment | $NH_3$ % (Vol) | 26.50 | 23.45 | 18.63 | 13.25 |

*refers to A110-2 ammonia synthesis catalyst made by Shangyu Chemical Plant, Zhejiang, China, which has been inspected by BASF Co. Germany and shows similar activity to that of the BASF catalysts.

As shown in Table 1 and Table 2, the exit ammonia concentration in reactor charged with the catalyst of this invention is 5–7% by volume higher than that when the conventional catalyst (A110-2 catalyst, made by Shangyu Chemical Plant, China) is used, and the relative activity of the catalyst of this invention at the same temperature is 19–45% higher than that of the conventional catalyst at a temperature range of 375° C. to 475° C. This effect increases with decreasing temperature. When the ammonia concentration at the reactor exit and other conditions are kept the same, the reaction temperature of the catalyst of this invention is 30°–50° C. lower than that of the conventional catalyst (A110-2) (see Table 3).

TABLE 3

Comparison of reaction temperature
at the same exit ammonia concentration in reactor

| NH$_3$ % (Vol %) | | 26.5 | 23.5 | 18.5 |
|---|---|---|---|---|
| Reaction Temperature °C. | A110-2 catalyst | 451 | 419 | 395 |
| | The inventive catalyst | 400 | 386 | 365 |

The reason for the excellent activity of the catalyst according to the invention is probably that the main phase of the inventive catalyst is no loger the magnetite but a non-stoichiometric ferrous oxide Wustite expressed as $Fe_{1-x}O$, and this change of the main phase results in favorable changes in surface nature, surface structure, pore structure, and distribution of promoters in the catalyst after reduction.

If only the catalyst of this invention is used in ammonia synthesis industry, the productivity and output of ammonia will be greatly increased, the reaction temperature and pressure will be remarkably lowered, and the energy consumption and production cost of ammonia will be decreased.

Figure 2:
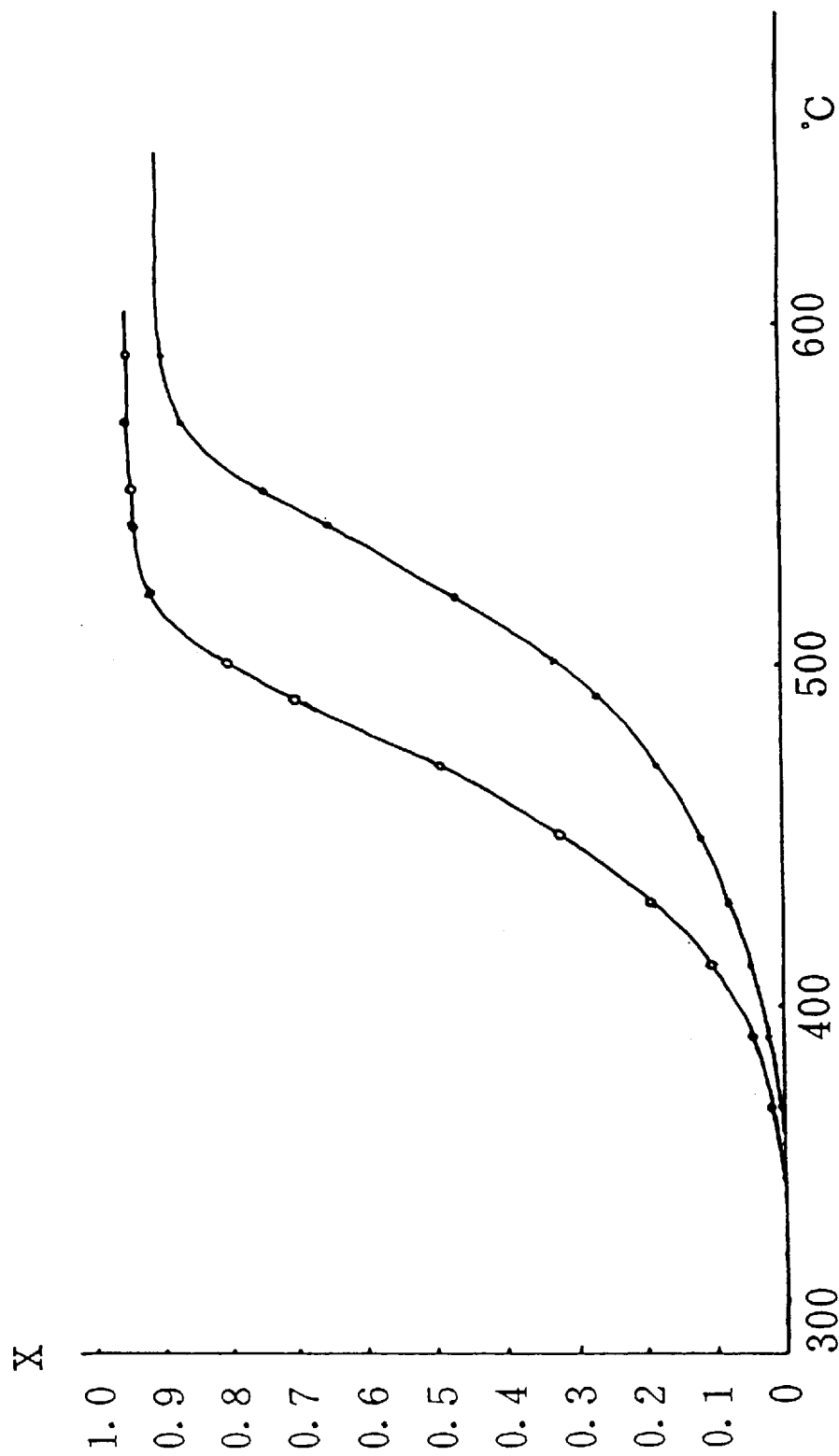
FIG. 2 shows the degree of reduction of the catalyst of the present invention as compared with a conventional catalyst.

The catalyst of this invention is apt to be reduced. The experimental results of isothermal reduction of the catalyst of this invention and of the conventional catalyst A110-2 at 450° C. in pure hydrogen (50ml/minute) (the device is TGA-40, particle size of the catalyst is 0.034–0.044mm, vertical coordinate is the degree of reduction, expressed as X, and horizontal coordinate is the time(minute)) are shown in FIG. 1. As seen from FIG. 1, the reduction rate of the catalyst of this invention is very high. For example, to reach a reduction degree 85%, the catalyst of this invention takes 52 minutes, while the conventional catalyst will take 156 minutes. The former is three times faster than the latter in reduction and the difference of the time consumption required for reduction increases while the reducton degree becomes higher. FIG. 2 gives the reduction curve of constant rate raising temperature for the catalyst of this invention and for the conventional catalyst A110-2 under the following conditions (the device is TGA-4) particle size= 0.034–0.044mm, flow rate of $H_2$=175ml/minute, temperature-raising rate=3° C./minute. Vertical coordinate is the degree of reduction, and horizontal coordinate is temperature ° C. in FIG. 2). FIG. 2 shows the terminal reduction temperature of the catalyst of this invention is 519° C., while that of the conventional catalyst is 619.7° C., the former is about 100° C. lower than the latter in temperature.

At the meantime, the reduction of the catalyst of this invention is more complete than that of the conventional catalyst (A110-2). As shown in FIG. 2, when the reduction temperature reaches 600° C., the degree of reduction, expressed as X, of the catalyst of this invention is 95% while only 90% for the conventional catalyst (A110-2). This distinctive advantage of this invention is resulted from the fact that the content of oxygen in Wustite expressed as $Fe_{1-x}O$ of the catalyst of this invention is only 22.3–24.1% by weight while $Fe_3O_4$ in the conventional catalyst has oxygen content of 27.6% by weight The former is only 80.8–87.3% of the latter in the amount of oxygen. This fact contributes to the remarkable decrease of the reduction time of the catalyst according to this invention in comparison with that of the conventional catalyst. The above advantages are all due to the new main phase of the catalyst having been changed from the conventional magnetite to the Wustite non-stoichiometric ferrous oxide according to this invention. The advantage of easy reduction of the catalyst of this invention may greatly shorten the reduction time of the catalyst. Besides, a lot of ammonia is formed during the reduction period, which saves the power of reduction furnace, decreases the gas consumption and increases the ammonia output.

The catalyst of this invention is of the high mechanical strength. For example, under the same condition of measurement, the attrition loss of the catalyst is 1.5% by weight for the conventional catalyst (A110-2) and but is only 0.5% by weight for the catalyst of this invention, which is also resulted from the nature of the Wustite crystalline structure. In addition, the catalyst is less sensitive to such poisoning substances as $O_2$, $H_2O$, O, $CO_2$, etc. than the conventional catalyst (A110-2) and has slower decrease in reaction temperature when poisoned and has faster rate of poison-removal. It also has good thermostability (Table. 1)). The expected service lift of the catalyst of this invention is 3–10 years.

Another distinctive feature of the process for the preparation of the catalyst according to this invention is that: the waste ammonia synthesis catalyst dischanged by factory can be fully recovered for making new catalyst. Before this invention is made, some people have conducted research into the recovery of waste ammonia synthesis catalyst (Van Cini.C.A. (Italy), Recovery of Ammonia Synthesis Catalyst Waste, Ammonia Synthesis, 1971, Soviet Union), they made the waste ammonia synthesis catalyst to transform into magnetite ($Fe_3O_4$) by oxidation, then melt the reoxided product by putting it into resistance furnace or inductor furnace or directly added the waste catalyst into the melting furnace passing through oxygen so as to oxidise it, but he catalyst made of it is still based on $Fe_3O_4$ and has a catalytic activity similar to that of the catalyst made of the natural magnetite. However, only little amount of waste ammonia synthesis catalysts has been recovered in practive by this way. The reason is that the technological process for the recovery through this oxidation routine is complicated with high cost, which is by no means cheaper than utilizing the natural magnetite; while the direct melting method, i.e method of non-oxidation recovery, is restricted by the view that the $Fe^{2+}/Fe^{3+}$ ratio must be in the range of 0.4 to 0.8, which make impossible the production of the catalyst with $Fe_3O_4$ as its main component through the direct melting routine, for the main component of the waste ammonia synthesis catalyst is the metal sponge iron (Fe), amounting to 80% or more in it. If the direct melting method is adopted to recover waste ammonia synthesis catalyst, it is impossible to produce the catalyst containing $Fe_3O_4$ as its main component with ratio of $Fe^{2+}/Fe^{3+}$ in the range of 0.4 to 0.8, only a iron material containing 80% of iron can be obtained, which prevents the attempts of recovering the waste ammonia synthesis catalyst from being realized. In the present invention, waste ammonia synthesis catalyst can be mixed with magnetite and promoters and turned in $Fe_{1-x}O$ Wustite at high temperature by oxidation-reduction reaction with the added magnetite. With recovery and melting occuring at the same time, the product is a renewed catalyst according to the present invention containing $Fe_{1-x}O$ Wustite as its main component, which has no loger the original chemical component and crystal structure of the waste catalyst. This invention not only has essentially tackled the problem of recovery of the waste ammonia synthesis catalyst, but also obtained a new catalyst with excellent performances. At the meantime, compared with the technology of waste catalyst recovery by means of oxidation above mentioned, the processive procedure is greatly simplified and the cost for producing the catalyst is lowered remarkably.

In the melting process according to this invention, the $Fe^{2+}/Fe^{3+}$ ratio is not restricted by the commonly-accepted range of 0.4–0.8, it works if only the ratio of $Fe^{2+}/Fe^{3+}$ is in range 2 to 20, which gives a wide range of operation flexibility.

The following examples are given merely for illustrative purposes and do not limit the protection scope of the invention.

EXAMPLE 1

22% by weight of iron, 68.6% by weight of magnetite, and promoters composed of 5.2% by weight of $Al_2O_3$, 0.7% by weight of $K_2O$, 3.1% by weight of CaO and 0.4% by weight of $V_2O_5$ (based on the total weight of the catalyst) were mixed and stirred in a mixer, and then melted in a resistance furance. After the melt was cooled in a cooler, the product with different particle sizes was made by crushing the solidified material. $Fe^{2+}/Fe^{3+}$ of the product is 7.6(EDTA Volumetry). The crystal phase of the main component is characterized to be Wustite, expressed as $Fe_{1-x}O$ by means of Mossbauer Spectrum and Powder X-ray diffraction (XRD), with lattice parameter of 0.4306 nm. Bulk density is 3.17g/cm$^3$ The specific surface area after reduction is 14.51 m$^2$/g (BET). The catalyst was then used to promote the synthesis of ammonia from a stoichiometric mixture of nitrogen and hydrogen at temperature of 450° C., pressure of 30Mpa and space velocity of 30,000m$^3$/m$^3$h, using 2ml of the catalytst with the particle size of 1.0–1.4) nm, the ammonia concentration at reactor exit (14mm fixed-bed reactor) is 31.63% by volume.

EXAMPLE 2

21.9% by weight of iron, 70.6% by weight of magnetite and promoters composed of 3.0% by weight of $Al_2O_3$, 1.0% by weight of $K_2O$, 0.5% by weight of BaO, 0.4% by weight of $MnO_2$ and 1.6% by weight of CaO (based on the total weight of catalyst) were mixed and stirred in a mixer, and then melted in a resistance furance. The rest steps are the same as in example 1. $Fe^{2+}/Fe^{3+}$ of the product is 5.9(EDTA Volumetry). The crystal phase of the main component is charactreized to be Wustite, expressed as $Fe_{1-x}O$, by means of Mossbauer Spectrum and Powder X-ray diffraction (XRD), with lattice parameter of 0.4299nm. The specific surface area after reduction is 15.10m$^2$/g (BET). Under the same experimental condition as in Example 1; the ammonia concentration at reactor exit (14mm fixed-bed reactor) is 31.01% by volume, and is 31.11% by volume after heating at 525° C. for 20 hours.

EXAMPLE 3

18.4% by weight of iron, 73.6% by weight of magnetite and promoters composed of 1.6% by weight of $Al_2O_3$, 1.3% by weight of $K_2O$, 1.5% by weight of CoO, 1.2% by weight of $WO_3$, 1.4% by weight of $V_2O_5$ and 1.0% by weight of CaO (based on the total weight of catalyst) were mixed and strried in a mixer, and then melted in a resistance furance. The rest steps are the same as in example 1. $Fe^{2+}/Fe^{3+}$of the product is 4.2(EDTA Volumetry). The crystal phase of the main component is characterized to be Wustite, expressed as $Fe_{1-x}O$, by means of Mossbauer Spectrum and Powder X-ray diffraction (XRD), with lattice parameter of 0.4284nm. The specific surface area after reduction is 13.7om$^2$/g (BET). Under the same experimental condition as in Example 1, the ammonia concentration at reactor exit (14mm fixed-bed reactor) is 30.17% by volume.

EXAMPLE 4

24.96% by weight of iron, 69.34% by weight of magnetite and promoters composed of 1.8% by weight of $Cr_2O_3$, 0.5% by weight of $K_2O$, 0.3% by weight of $CeO_2$, or and 0.3% by weight of $La_2O_3$ (based on the total weight of catalyst) were mixed and strried in a mixer, and then melted in a resistance furance. The rest steps are the same as in example 1. $Fe^{2+}/Fe^{3+}$ of the product is 11.1 (EDTA Volumetry). The crystal phase of the main component is characterized to be Wustite, expressed as $Fe_{1-x}O$, by means of Mossbauer Spectrum and Powder X-ray diffraction (XRD), with lattice parameter of 0.4321nm. The specific surface area after reduction is 14.20m$^2$/g (BET). Under the same experimental condition as in Example 1, the ammonia concentration at reactor exit (14mm fixed-bed reactor) is 29.05% by volume, and is 28.85% by volume after heating at 525° C. for 20 hours.

EXAMPLE 5

27.6% by weight of waste A110-2 ammonia synthesis catalyst discharged from factory, 69% by weight of magnetite and promoters composed of 1.0% by weight of $Al_2O_3$, 0.3% by weight of $K_2O$, 0.9% by weight of CaO, 0.5% by weight of MgO, 0.4% by weight of $V_2O_5$ and 0.3% by weight of $WO_3$ (based on the total weight of catalyst) were mixed and strried in a mixer, and then melted in a resistance furnace. The rest steps are the same as in Example 1. $Fe^{2+}/Fe^{3+}$ of the product is 8.51(EDTA Volumetry). The crystal phase of the main component is characterized to be Wustite, expressed as $Fe_{1-x}O$, by means of Mossbauer Spectrum and Powder X-ray diffraction (XRD), with lattice parameter of 0.4311 nm. The specific surface area after reduction is 14.95m$^2$/g (BET). Under the same experimental condition as in Example 1, the ammonia concentration at reactor exit (14mm fixed-bed reactor) is 31.40% by volume.

We claim:

1. A catalyst for ammonia synthesis comprising a main phase and at least two promoters, wherein the main phase is a non-stochiometric ferrous oxide which is structurally in a Wustite crystal phase form having a rock salt face-centered cubic lattice with lattice parameter of 0.427–0.433 nm.

2. The catalyst according to claim 1, wherein the said non-stoichiometric ferous oxide is of the formula $Fe_{1-x}O$ wherein x=0.023–0.14, and the ratio of divalent iron and trivalent iron ($Fe^{2+}/Fe^{3+}$) ranges from 2 to 20.

3. The catalyst according to claim 1, wherein the ratio $Fe^{2+}/Fe^{3+}$ ranges from 3 to 12.

4. The catalyst according to claim 1, wherein the said promoters are selected from the group consisting of $Al_2O_3$, $K_2O$, CaO, $WO_3$, CoO, $ZrO_2$, $MnO_2$, $MoO_3$, $Cr_2O_3$, $V_2O_5$, MgO, BaO, $SiO_2$ and rare-earth metal oxides.

5. The catalyst according to claim 1, wherein the said catalyst contains 88–98% by weight of the non-stoichiometric ferrous oxide in Wustite crystal phase form and 2–12% by weight of the promoters.

6. The catalyst according to claim 1, wherein the chemical composition of the main phase formulated as $Fe_{1-x}O$ is 56–93% by weight of FeO and 5–35% by weight of $Fe_2O_3$ (based on the total weight of the catalyst).

7. The catalyst according to claim 1, wherein the catalyst contains 92–97% by weight of the non-stoichiometric ferrous oxide in Wustite crystal phase form and 3–8% by weight of the promoters.

8. The catalyst according to claim 1, wherein the chemical composition of the main phase formulated as $Fe_{1-x}O$ is 59–92% by weight of FeO and 4.9–34% by weight of $Fe_2O_3$ (based on the total weight of the catalyst).

9. A process for the preparation of the catalyst of claim 1, comprising mixing iron or carbon with magnetite and at least two promoters, and melting the mixture, then solidifying and crushing the solid, wherein the input ratio of iron or carbon to magnetite is such that the main phase of the catalyst product is a non-stoichiometric ferrous oxide formulated as $Fe_{1-x}O$ where $x=0.023–0.14$, which is structurally in a Wustite crystal phase form having the rock salt face-centered cubic lattice with lattice parameter of 0.427–0.433 nm.

10. The process of claim 9, wherein the ratio of divalent iron to trivalent iron in the catalyst product is in the range of 2 to 20.

11. The process of claim 9 wherein the ratio of divalent iron to trivalent iron in the catalyst product is in the range of 3 to 12.

12. The process of claim 9 wherein the promoters are two or more substances selected from the group consisting of $Al_2O_3$, $K_2O$, $CaO$, $WO_3$, $CoO$, $ZrO_2$, $MnO_2$, $MnO_3$, $Cr_2O_3$, $V_2O_5$, $MgO$, $BaO$, $SiO_2$ and rare-earth metal oxides.

13. The process of claim 9 wherein the main phase of the catalyst product contains 88–98% by weight of the non-stoichiometric ferrous oxide formulated as $Fe_{1-x}O$ which is in Wustite crystal phase form, based on the total weight of the catalyst.

14. The process of claim 9 wherein the non-stoichiometric ferrous oxide formulated as $Fe_{1-x}O$ is 56–93% by weight of FeO and 5–35% by weight of $Fe_2O_3$, based on the total weight of the catalyst.

15. The process of claim 9 wherein the main phase of the catalyst product contains 92–97% by weight of the non-stoichiometric ferrous oxide which is in Wustite crystal phase form and 3–8% by weight of the promoters, based on the total weight of the catalyst.

16. The process of claim 9 wherein the non-stoichiometric ferrous oxide formulated as $Fe_{1-x}O$ is 59–92% by weight of FeO and 4.9–34% by weight of $Fe_2O_3$, based on the total weight of the catalyst.

17. In a method for the synthesis of ammonia wherein hydrogen and nitrogen are contacted with a catalyst to form ammonia, the improvement which comprises said catalyst being the catalyst of claim 1.

18. In a method for the synthesis of ammonia wherein hydrogen and nitrogen are contacted with a catalyst to form ammonia, the improvement which comprises said catalyst being the catalyst of claim 2.

19. In a method for the synthesis of ammonia wherein hydrogen and nitrogen are contacted with a catalyst to form ammonia, the improvement which comprises said catalyst being the catalyst of claim 3.

* * * * *